United States Patent [19]

Braun et al.

[11] 4,124,195
[45] Nov. 7, 1978

[54] CONTROL VALVE, PARTICULARLY FOR PULSATING ROCKET ENGINES

[75] Inventors: Karl Braun, Bürg; Reinhold Tussetschläger, Kochersteinsfeld, both of Germany

[73] Assignee: Messerschmitt-Bolkow-Blohm GmbH, Germany

[21] Appl. No.: 406,190

[22] Filed: Oct. 15, 1973

[30] Foreign Application Priority Data

Oct. 28, 1972 [DE] Fed. Rep. of Germany ....... 2253059

[51] Int. Cl.² .............................................. F16K 1/00
[52] U.S. Cl. .................................. 251/333; 251/359; 251/368
[58] Field of Search .............................. 251/355–365, 251/333, 334

[56] References Cited

U.S. PATENT DOCUMENTS

| 341,345 | 5/1886 | Pickering | 251/360 |
|---|---|---|---|
| 1,234,096 | 7/1917 | Farrell | 251/333 X |
| 3,022,978 | 2/1962 | Kowalski | 251/363 X |
| 3,145,733 | 8/1964 | Shaw et al. | 251/368 X |
| 3,168,282 | 2/1965 | Latshaw et al. | 251/333 |
| 3,253,300 | 5/1966 | Gove et al. | 251/333 X |
| 3,698,427 | 10/1972 | Baranowski | 251/333 X |

FOREIGN PATENT DOCUMENTS 1,196,263  5/1959  France ....................................... 251/333

Primary Examiner—Charles J. Myhre
Assistant Examiner—Ira S. Lazarus
Attorney, Agent, or Firm—McGlew and Tuttle

[57] ABSTRACT

A control valve for a pulsating rocket engine comprises a valve seat and a movable valve part, one of which has a facing surface, of a non-deformable material, having a plurality of concentrically arranged saw-tooth shaped sealing ridges with flat sealing faces at their apices which extend perpendicular to the movement direction or force application direction. The other valve part has a facing surface of polytetrafluorethylene or polyamide which is initially smooth and plain but which, upon the first closing operation of the valve, responsive to a pressure load thereon exceeding a predetermined pressure load, is irreversibly deformed by the saw-tooth shaped sealing ridges, with flat sealing faces, of the other valve part to form therein grooves complementary to the sealing ridges. The included angle between the striking and sealing flanks of the ridges has a value such that, upon subsequent closing operations of the valve, the synthetic resin material, which has not been irreversibly deformed, can flow into the spaces between the annular sealing ridges without exceeding its irreversible deformation yield point, to form an elastic buffer.

4 Claims, 1 Drawing Figure

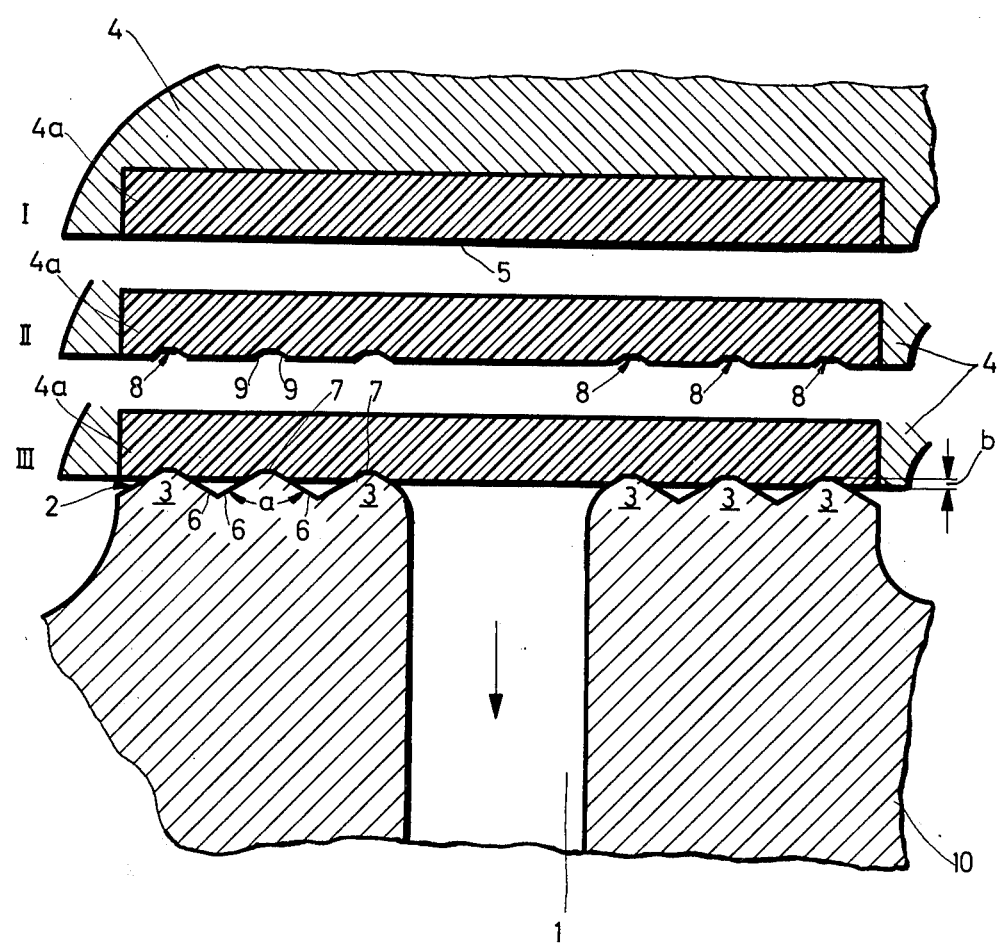

CONTROL VALVE, PARTICULARLY FOR PULSATING ROCKET ENGINES

BACKGROUND OF THE INVENTION

1. Field of the Invention

This invention relates in general to rocket engine construction and, in particular, to a new and useful control valve for pulsating rocket engines.

2. Description of the Prior Art

In pulsating or intermittent rocket engines, there is the special problem of the construction and design of the valves which control the supply of the fuels to the combustion chamber, due to the use of chemically aggressive fuels. Pulsating or intermittent rocket engines are frequently used as control engines to regulate the position of satellites and must therefore be laid out for a great number of working cycles and still remain fully effective. In addition, this type of engine is very small and the manufacture of the valves must therefore meet the highest standards to obtain exact valve times and thus accurate doses of the desired amounts of fuel for the engine.

It is desirable, therefore, to provide a control valve particularly for rocket engines, which meets the requirements of a long life expectancy and many load cycles, while maintaining at the same time its full efficiency with a simple constructional design.

SUMMARY OF THE INVENTION

The invention provides a valve including a valve seat and a moving valve part having facing surfaces interengageable responsive to movement of the valve part in a valve-closing direction, and the facing surface of either the valve seat or the moving valve part is formed with several concentrically arranged sawtooth-shaped sealing ridges with sealing crests flattened perpendicularly to the closing direction of the valve (direction of force) and with oblique flanges on both made of a strong material, like steel etc., while the facing surface of the other part of the valve, either the valve seat or the moving valve part, comprises particularly polytetrafluorethylene or polyamide, and is a continuous initially plane (unprofiled) sealing or facing surface before the start of operation of the valve.

According to the invention, the angle of pressure of the sealing ridges is about 120°. Due to the design of the control valve, of the valve seat and of the moving valve part, according to the invention, sealing zones are formed automatically at the start of the valve operation during the first valve cycle and, in addition, it is ensured that these sealing zones are maintained with absolute sealing properties, during the further movements of the valve, in the form produced at the beginning. This is achieved according to the invention because as the valve enters the plastically deformable material it is deformed locally, i.e. beyond its yield point, by flattened sealing crests, i.e. the plastic material undergoes a permanent deformation in the sense that a (negative) counter-profile, which is adapted exactly to the form of the sealing crests, is formed automatically or maintained on the part of the plastic material in the range of the sealing crests. This is ensured by the fact that the range of the plastic material adjacent to the sealing crests provided on both sides of the sealing crests can increase by the flanks without its yield point being exceeded, i.e. the travel force ratios remain in the flank regions within Hook's law, so that an elastic buffer device is formed for the delay of the final valve movement. This ensures that the initially produced permanent local deformation of the plastic material does not advance in the range of the sealing crests on their two sides.

Though there are already known control valves, in engines working with chemical fuels and in apparatus and devices of the chemical industry, which have a valve seat of polytetrafluoroethylene or a valve cover coated with this material, the corresponding surfaces are here conformed or form-closed with each other.

Accordingly, it is an object of the invention to provide an improved valve construction for a pulsating rocket engine which includes a valve seat and a movable valve having interengageable facing surfaces, with the facing surface of one of them having a plurality of spaced ridges with flattened ends perpendicular to the valve movement direction or force application direction and with the facing surface of the other of them having an initially smooth contact face which is deformable to form a complementary sealing face after operation.

A further object is to provide a valve which is simple in design, rugged in construction and economical to manufacture.

For an understanding of the principles of the invention, reference is made to the following description of a typical embodiment of the invention as illustrated in the accompanying drawings.

BRIEF DESCRIPTION OF THE DRAWINGS

In the drawings:

The only FIGURE of the drawings is an enlarged partial sectional view of a valve constructed in accordance with the invention.

GENERAL DESCRIPTION OF THE PREFERRED EMBODIMENT

Referring to the drawing, the invention comprises a rocket engine with a head 10 having an inlet end face, of a fuel supply duct 1 extending toward the rocket combustion chamber, which forms a valve seat 2 of a control valve and its facing or sealing surfaces provided with concentrically arranged sealing ridges 3. These are made of a strong, i.e. nondeformable material such as steel, etc. But a sealing body 4a inserted and carried on a moving valve part 4 is made of a material which is plastically deformable within certain limits, particularly polytetrafluorethylene or polyamide with a continuous plane (unprofiled) sealing or facing surface 5 before the start of the operation, as it is shown in position I.

The sealing ridges 3 are flattened at their tops below the vertex of their two flanks 6 to define sealing crests 7 extending perpendicularly to the closing or force direction of the valve. The angle of pressure $a$ of the sealing ridges 3 is about 120°.

During the period of operation of the control valve, sealing ring surfaces 8 are produced in the sealing surface 5 in the view of the pairing of the material of the sealing ridges 3 with the sealing body 4a as well as the dimensioning of the pressing surfaces of the sealing crests 7 with regard to the valve closing force of the specific pressure on the ring surfaces of the sealing crests 7, because the admissible surface pressure is exceeded on the part of the plastically deformable material so that a local deformation is produced. In other words, during the break-in period sealing ring surfaces 8 are formed on the sealing body 4a along its sealing surface 5 which are adapted to and complementary to the sealing crests 7. In order to prevent the sealing ring surfaces 8 from increasing in the course of the further operation, which would lead finally to the destruction of the sealing body 4a, flank striking surfaces 6 are provided. They compensate for the valve closing force during the entrance stroke b, which corresponds to the depression of the sealing ring surfaces 8, particularly by the counter force which is produced by the oblique surfaces 9 in the sealing body 4a which strike on the flanks 6. The process of the action in the flank regions 9 takes place in accordance with Hook's law, so that there is no destruction of the plastically deformable material. Position II (dotted lines) shows the open valve with the sealing body 4a lifted after the recessed sealing surfaces 8 are formed. The position indicated III shows the closed valve with the attached sealing body 4a.

While a specific embodiment of the invention has been shown and described in detail to illustrate the application of the principles of the invention, it will be understood that the invention may be embodied otherwise without departing from such principles.

What is claimed is:

1. A shut-off control valve, particularly for pulsating rocket engines, comprising a stationary valve seat and a moving valve part having facing surfaces interengageable responsive to movement of said valve part in a valve-closing direction, the facing surface of one of said valve seat and said moving valve part having a plurality of concentrically arranged annular sawtooth-shaped sealing ridges with relatively narrow flat sealing crests extending perpendicularly to the valve-closing direction, and having oblique planar striking flanks on each side of said crests, made of a strong material such as steel, the facing surface of the other one of said valve seat and said moving valve part being made of a relatively soft elastic synthetic resin material that, above a predetermined pressure load thereon, is irreversibly deformable, and having a continuous initially plane smooth facing surface before the first closing operation of the valve, but being irreversibly deformed, to form a facing surface which is complementary to the other facing surface, having said sealing ridges, responsive to a pressure load thereon, exceeding said predetermined pressure lead, upon initial closing of the valve, by interengagement of said facing surfaces; the included angle between said striking flanks having a value such that, upon subsequent closing operation of the valve, said elastic synthetic resin material can flow into the spaces between said annular sealing ridges without exceeding its irreversible deformation yield point, to form an elastic buffer.

2. A control valve, according to claim 1, wherein the angle defined between the flanks of the sealing ridges is about 120°.

3. A control valve, according to claim 1, wherein the facing surface of said other of said valve seat and said moving valve part is made of a polytetrafluoroethylene.

4. A control valve, according to claim 1, wherein the facing surface of said other of said valve seat and said moving valve part is a polyamide.

* * * * *